US009867240B2

(12) United States Patent
van den Broeke et al.

(10) Patent No.: US 9,867,240 B2
(45) Date of Patent: Jan. 9, 2018

(54) FILTER CIRCUIT

(71) Applicant: NXP B.V., Eindhoven (NL)

(72) Inventors: Leendert van den Broeke, Nijmegen (NL); Tobias Doom, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/181,730

(22) Filed: Jun. 14, 2016

(65) Prior Publication Data

US 2017/0006675 A1 Jan. 5, 2017

(30) Foreign Application Priority Data

Jun. 30, 2015 (EP) .................................... 15174691

(51) Int. Cl.
*H05B 37/02* (2006.01)
*H05B 33/08* (2006.01)
*H02M 1/08* (2006.01)
*H02M 1/14* (2006.01)
*H02M 1/42* (2007.01)
(Continued)

(52) U.S. Cl.
CPC .......... *H05B 33/0815* (2013.01); *H02M 1/08* (2013.01); *H02M 1/14* (2013.01); *H02M 1/42* (2013.01); *H02M 7/04* (2013.01); *H05B 33/0848* (2013.01); *H05B 33/0851* (2013.01); *H02M 2001/0009* (2013.01)

(58) Field of Classification Search
CPC ............ H05B 33/0815; H05B 33/0818; H05B 33/0827; H05B 33/0851; H05B 33/0866; H05B 33/0887

USPC ................................................. 315/186, 297
See application file for complete search history.

(56) References Cited

U.S. PATENT DOCUMENTS 9,155,174 B2 * 10/2015 Draper ............... H05B 41/3924
2011/0248639 A1 * 10/2011 Peker ................. H05B 33/0818
315/192
(Continued)

FOREIGN PATENT DOCUMENTS

CN       104065266 A    9/2014
JP       2005116738 A   4/2005
WO       WO-2009/064682 A3  2/2009

OTHER PUBLICATIONS

Extended European Search Report for Patent Appln. No. 15174691.4 (Feb. 8, 2016).
(Continued)

*Primary Examiner* — Tung X Le

(57) ABSTRACT

A filter circuit comprising a first feedback circuit configured to: receive a sensed-voltage-level-signal representative of a sensed voltage across a current sensing element; receive a voltage-set-point-signal; and set a regulation-control-signal for a current regulation device such that the sensed-voltage-level-signal tends towards the voltage-set-point-signal. The filter circuit also comprises a second feedback circuit configured to: receive a predetermined-threshold-signal; and receive a regulation-control-voltage-signal, representative of a voltage level of the regulation-control-signal. The second feedback circuit is configured to adjust the voltage-set-point-signal in accordance with a comparison between the regulation-control-voltage-signal and the predetermined-threshold-signal.

17 Claims, 5 Drawing Sheets

(51) Int. Cl.
*H02M 7/04* (2006.01)
*H02M 1/00* (2006.01)

(56) References Cited

U.S. PATENT DOCUMENTS

| | | | |
|---|---|---|---|
| 2014/0015427 A1* | 1/2014 | Sagen | H05B 33/083 |
| | | | 315/186 |
| 2014/0239810 A1 | 8/2014 | Martin-Lopez et al. | |
| 2016/0011613 A1 | 1/2016 | Xu | |
| 2016/0088702 A1* | 3/2016 | Gray | H05B 33/0851 |
| | | | 315/185 R |
| 2016/0338164 A1* | 11/2016 | Nederbragt | H05B 33/0851 |

OTHER PUBLICATIONS

Inventronics, INV3121 Ripple Suppressor for LED Lighting, Jan. 27, 2014.
Joulwatt Technology Inc.; "JW1230—100/120Hz Current Ripple Remover—Datasheet, Rev.0.22"; 11 pages (2014).
Roland Van Roy, Minimizing Light Flicker in LED Lighting Applications, Richtek Application Note, AN022—Jul. 2014.
Silergy; "Application Notes: AN_SY5862, Adaptive LED Current Filter for LED Lighting—Preliminary Specification"; 8 pages.

\* cited by examiner

FILTER CIRCUIT

CROSS-REFERENCE TO RELATED APPLICATIONS

This application claims the priority under 35 U.S.C. §119 of European patent application no. 15174691.4, filed Jun. 30, 2015 the contents of which are incorporated by reference herein.

BACKGROUND

The present disclosure relates to filter circuits, and in particular although not necessarily, ripple current reduction filter circuits.

LED lamps that are connected to a mains electricity supply may need to comply with various regulations. One such regulation is for example the Energystar requirement that lamps with an input power >5 W must have a power factor (PF) >0.7. Another example is IEC61000-3-2 that sets tight limits to the harmonic distortion of the input current for lamps consuming more than 25 W. Having a power factor close to unity and a total harmonic distortion below a few percent can imply that the input current has almost the same shape as, and is in phase with, the waveform of the mains input voltage. Other requirements can address the quality of light, for example by demanding a low amplitude of the ripple in the intensity of the radiated light. As is known in the art, "ripple" is an unwanted residual periodic variation of a direct current (DC) waveform.

These requirements in terms of having both (i) a high power factor, and (ii) a low output ripple have consequences for the design of LED drivers.

SUMMARY

According to a first aspect of the present disclosure there is provided a filter circuit comprising:
a first input terminal;
a reference terminal, wherein the filter circuit is configured to receive an input voltage waveform across the first input terminal and the reference terminal;
a current regulation device; and
a current sensing element,
wherein:
  the current regulation device comprises a conduction channel and a control terminal, wherein the current regulation device is configured to regulate current flow through the conduction channel in accordance with a regulation-control-signal received at its control input; and
  (i) the current sensing element and (ii) the conduction channel of the current regulation device, are connected in series with each other between the first input terminal and the reference terminal;
the filter circuit further comprising:
  a first feedback circuit configured to:
    receive a sensed-voltage-level-signal representative of a sensed voltage across the current sensing element;
    receive a voltage-set-point-signal; and
    set the regulation-control-signal such that the sensed-voltage-level-signal tends towards the voltage-set-point-signal; and
  a second feedback circuit configured to:
    receive a predetermined-threshold-signal;
    receive a regulation-control-voltage-signal, representative of a voltage level of the regulation-control-signal; and
    adjust the voltage-set-point-signal in accordance with a comparison between the regulation-control-voltage-signal and the predetermined-threshold-signal.

Such a filter circuit can reduce a ripple component in the received input voltage waveform in an efficient and effective way.

In one or more embodiments the second feedback circuit is configured to reduce the voltage-set-point-signal if the regulation-control-voltage-signal exceeds the predetermined-threshold-signal, and otherwise increase the voltage-set-point-signal. In one or more embodiments the second feedback circuit is configured to increase the voltage-set-point-signal if the regulation-control-voltage-signal is less than the predetermined-threshold-signal, and otherwise decrease the voltage-set-point-signal. It will be appreciated that the specific implementation of the second feedback circuit will depend upon the polarity of components that are used.

In one or more embodiments the first feedback circuit is configured to regulate the regulation-control-signal, optionally continuously, at a first-regulation-bandwidth that is greater than that of a ripple component of the input voltage waveform. The first-regulation-bandwidth may be at least 5, 10, 100, 1,000 or 10,000 times greater than that of the ripple component of the input voltage waveform.

In one or more embodiments the second feedback circuit is configured to reduce the voltage-set-point-signal if the regulation-control-voltage-signal exceeds the predetermined-threshold-signal, at a second-regulation-bandwidth. The second-regulation-bandwidth may be less than that of the ripple component of the input voltage waveform. The second-regulation-bandwidth may be at least 10, 50, 100 or 200 times less than that of the ripple component of the input voltage waveform.

In one or more embodiments the frequency of the ripple component of the input voltage waveform is 100 Hz or 120 Hz.

In one or more embodiments the first feedback circuit comprises an error-amplifier comprising an error-amplifier-first-input-terminal, an error-amplifier-second-input-terminal and an error-amplifier-output-terminal. The error-amplifier-first-input-terminal may be connected to the conduction channel of the current regulation device or the current sensing element in order to receive the sensed-voltage-level-signal. The error-amplifier-second-input-terminal may be connected to the second feedback circuit in order to receive the voltage-set-point-signal. The error-amplifier-output-terminal may be connected to the control terminal of the current regulation device.

In one or more embodiments the second feedback circuit comprises a threshold-voltage-source configured to provide a signal that corresponds to the predetermined-threshold-signal. The second feedback circuit may comprise a set-point-discharge circuit connected to the error-amplifier-second-input-terminal, and optionally between threshold-voltage-source and the error-amplifier-second-input-terminal. The set-point-discharge circuit may be configured to reduce the voltage-set-point signal if the regulation-control-voltage-signal exceeds the predetermined-threshold-signal. The second feedback circuit may also comprise a set-point-charge circuit connected to the error-amplifier-second-input-terminal.

The set-point-charge circuit may be configured to increase the voltage-set-point signal if the regulation-control-voltage-signal does not exceed the predetermined-threshold-signal.

In one or more embodiments the discharge circuit comprises an operational amplifier comprising an op-amp-first-input-terminal, an op-amp-second-input-terminal, and an op-amp-output-terminal. The op-amp-first-input-terminal may be connected to the control terminal of the current-regulation-transistor in order to receive the regulation-control-voltage-signal. The op-amp-second-input-terminal may be connected to the threshold-voltage-source. The op-amp-output-terminal may be connected directly or indirectly to the error-amplifier-second-input-terminal such that a signal at the op-amp-output-terminal can reduce the voltage-set-point-signal provided to the error-amplifier-second-input-terminal.

In one or more embodiments the voltage source is configured to provide a voltage signal at a level that is below the maximum voltage that is available to drive the control terminal of the current regulation device.

In one or more embodiments the set-point-charge comprises: a regulator-resistor and an auxiliary voltage supply. The regulator-resistor may be connected in series between the auxiliary voltage supply and the error-amplifier-second-input-terminal.

In one or more embodiments the second feedback circuit comprises a second-feedback-transistor, the second-feedback-transistor comprising a conduction channel and a control terminal. The second-feedback-transistor may be configured to regulate current flow through the conduction channel in accordance with signal received at its control input. The conduction channel of the second-feedback-transistor may be connected in series between the reference terminal and the error-amplifier-second-input-terminal. The control terminal of the second-feedback-transistor may be connected to the op-amp-output-terminal.

In one or more embodiments the second feedback circuit also comprises a resistive divider, which includes a first-resistive-divider-resistor and a second-resistive-divider-resistor. The resistive divider may be connected between the control terminal of the current regulation device and the reference terminal. The node between the first-resistive-divider-resistor and the second-resistive-divider-resistor may be connected to the op-amp-first-input-terminal.

In one or more embodiments the current regulation device comprises a MOST or a bipolar transistor.

There may be provided a power converter circuit comprising:
  any filter circuit disclosed herein;
  an LED load; and
  a PFC circuit;
  wherein a terminal of the LED load is connected to either the first input terminal or the reference terminal of the filter circuit, and wherein the LED load and the filter circuit are together connected in series across an output of the PFC circuit.

In one or more embodiments, the power converter circuit further comprises an output capacitor connected across the output of the PFC circuit.

There may be provided a power converter circuit comprising:
  any filter circuit disclosed herein; and
  a PFC circuit configured to provide the input voltage waveform across the first input terminal and the reference terminal of the filter circuit.

There may be provided an integrated circuit comprising any filter circuit disclosed herein, or any power converter circuit disclosed herein.

There may be provided a computer program, which when run on a computer, causes the computer to configure any apparatus, including a filter, circuit, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One of more embodiments will now be described by way of example only with reference to the accompanying drawings in which.

DETAILED DESCRIPTION

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

LED lamps make use of driver circuits to regulate the LED current ICED. It can be difficult to design a driver that simultaneously achieves a good power factor (input current requirement) and a low LED current ripple (output current requirement), which can be required for a high quality of light. As will be discussed with reference to FIG. 1, two power converters can be cascaded to achieve good power factor and low output current ripple. The first stage achieves good power factor and provides a stable input for the second power converter, which achieves low output current ripple.

As will be discussed below, the example of embodiment of FIG. 7, for example, provides a linear ripple filter circuit that can replace one of the two power converters of FIG. 1, but is lower cost for a similar output current ripple. The linear ripple filter circuit can be cascaded with a power converter that achieves a good power factor, but still has significant output current ripple.

Figure 1:
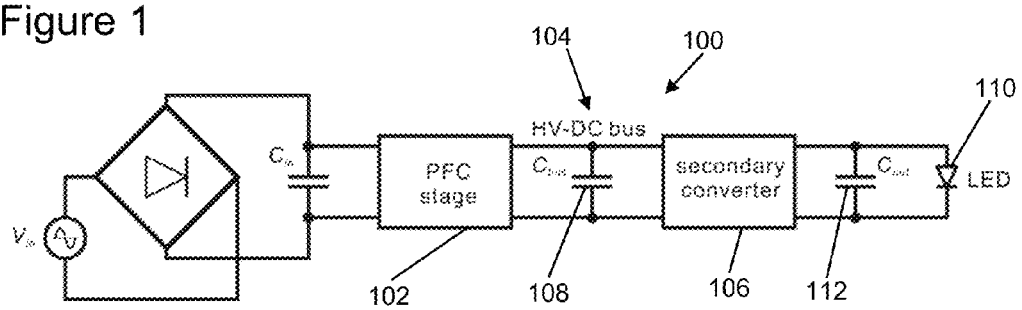
FIG. 1 illustrates a converter circuit that comprises a two-stage power converter.

FIG. 1 illustrates a converter circuit 100 that comprises a two-stage power converter. The two-stage power converter includes a power-factor-correction (PFC) stage 102, a buffer capacitor $C_{bus}$ 108 connected across the output terminals of the PFC stage 102, a secondary converter 106, an output capacitor $C_{out}$ 112 connected across the output terminals of the secondary converter 106, and an LED 110. The LED 110 is the load and is also connected across the output terminals of the secondary converter 106.

The PFC stage 102 is used to provide a high power factor. The PFC stage 102 generates a high-voltage (HV) for a DC bus 104, which is used to supply the second power converter 106. For a low distortion on the input current, the power drawn by the PFC stage 102 and the current supplied into the buffer capacitor $C_{bus}$ 108, follows the product of momentary input voltage and current:

$$P_{in} = v_{in}i_{in} = A_v\sin(\omega t) \cdot A_c\sin(\bar{\omega}t) = \frac{A_v A_c}{2}(1 - \cos(2\bar{\omega}t))$$

Where:
$A_v$ is the amplitude of the input voltage,
$A_c$ is the amplitude of the input current, and
ω denotes the radian frequency of the input signal.

Assuming the PFC stage 102 has a DC output voltage $V_{bus}$, its output current follows the same waveform, resulting in a ripple current given by:

$$i_{bus} = I_0(1 - \cos(2\hat{\omega}t))$$

Where:
Io is the average current.

However, in practice the output voltage of the PFC stage 102 will not be constant. Instead the voltage across the buffer capacitor $C_{bus}$ 108 will contain a ripple.

The secondary power converter 106 drives the LED 110 with a ripple-free current. As the input of the secondary stage 106 is more or less a DC voltage, a low output current ripple (and low output voltage ripple) can be relatively straightforward to achieve. However, the cost and complexity of the two-stage solution of FIG. 1 is relatively high. For example, it requires two high-voltage power switches, two switch controllers and two power inductors.

Figure 2:
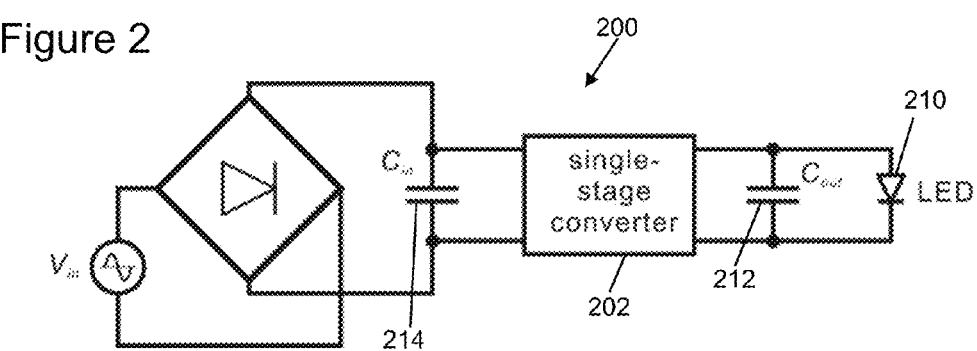
FIG. 2 illustrates a converter circuit that includes a single-stage power converter.

FIG. 2 illustrates a converter circuit 200 that includes a single-stage power converter 202. An input capacitor $C_{in}$ 214 is connected across the input terminals of the power converter 202. An output capacitor $C_{out}$ 212 is connected across the output terminals of the power converter 202.

In some cases, in particular for lamps in residential use, the requirements of the amplitude of the ripple in the LED current can be more relaxed. For example, a 50% peak-peak ripple (as a fraction of average current) may be acceptable. In which case the driver of FIG. 2 can be used with a small input capacitor 214, proper waveform shaping (for good enough power factor) and a reasonably sized output capacitor 212. For example, a 1 mF 35V output capacitor can be used for a 10 W lamp/LED 210. The magnitude of the ripple current will depend on the value of the output capacitor 212 and a dynamic impedance of the LED load 210.

However, for other examples that require a significantly lower output ripple (such as 5% peak-peak) the single stage solution of FIG. 2 can be challenging to use because capacitor values and sizes can be impractically large. It will be appreciated that, for lighting applications, a lower ripple will result in reduced flickering of light produced by the LED.

Figure 3:
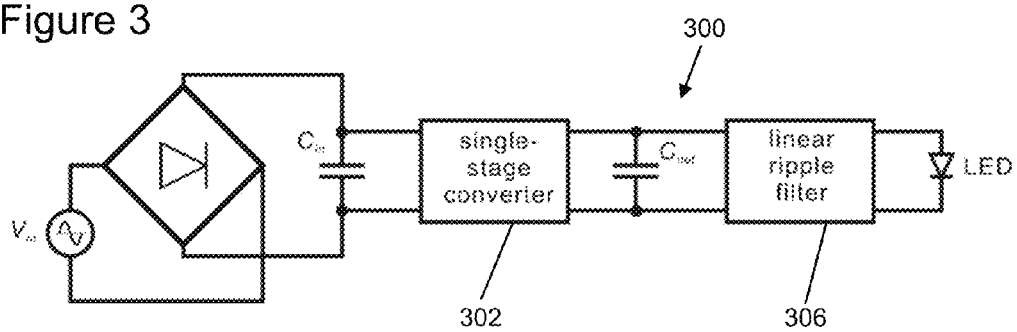
FIG. 3 shows an example embodiment of a converter circuit that includes a single-stage power converter and a linear ripple filter circuit.

FIG. 3 shows a power converter circuit 300 that includes a single-stage power converter 302 and a linear ripple filter circuit 306.

The linear ripple filter circuit 306 is an active circuit that can reduce (and in some examples substantially eliminate) the output voltage ripple and current ripple. The linear ripple filter circuit 306 can be simpler than a second PFC stage (such as the one shown in FIG. 1) and therefore can also be of lower cost. The output capacitor $C_{out}$ can be reduced many times for the same ripple performance and therefore the addition of the filter circuit 306 can also be lower cost than simply using a larger output capacitor.

In some examples, the linear ripple filter circuit 306 can reduce the overall efficiency of the converter circuit. However, the power losses in an optimized solution (which may be about 2-4%) may not be higher than the power loss in a typical PFC stage.

Figure 4:
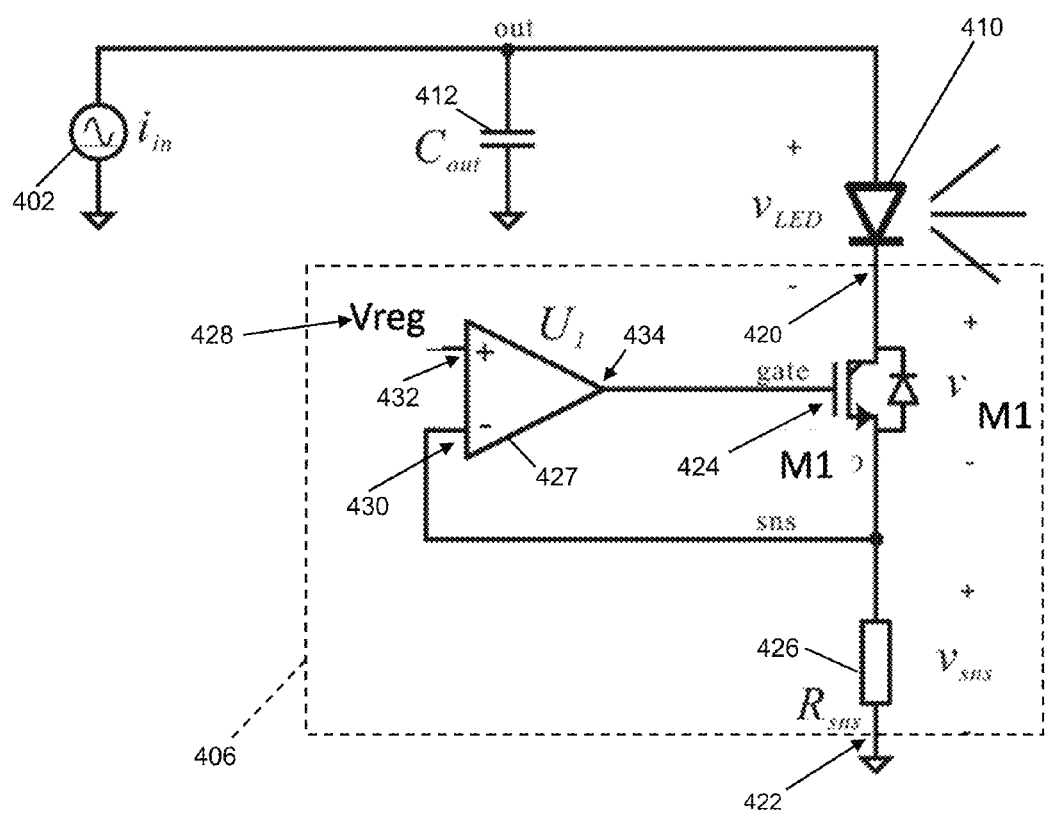
FIG. 4 illustrates a linear ripple filter circuit, which can be used with the converter circuit of FIG. 3 for example.

FIG. 4 illustrates an example linear ripple filter circuit 406, which can be used with the converter circuit of FIG. 3 for example. That is, the linear ripple filter circuit 406 can be placed between a buffer capacitor $C_{out}$ (which may be supplied by a single stage converter) and an LED/load.

The filter circuit 406 includes a first input terminal 420 and a reference terminal 422. In this example, the reference terminal 422 is connected to ground. The first input terminal 420 is shown in FIG. 4 as connected indirectly to an input current source $i_{in}$ 402, which provides a current signal that has an AC component. In this way, the filter circuit 406 receives an input voltage waveform across the first input terminal 420 and the reference terminal 422.

The input current source 402 may be provided as a PFC circuit, optionally a single PFC circuit as shown in FIG. 3, or a linear current source. The AC component of the current signal represents a ripple component of output of the PFC circuit. An output capacitor $C_{out}$ 412 is connected across the input current source 402 in order to smooth the current signal.

In this example, an LED load 410 is shown connected in series in between the first input terminal 420 of the filter circuit 406 and the input current source 402. It will be appreciated that other connections to the LED load 410 are possible. For example, the LED load 410 may be connected in series between the reference terminal 422 of the filter circuit 406 and ground.

The filter circuit 406 includes a current regulation device 424 and a current sensing element 426. In this example, the current regulation device 424 is a current-regulation-transistor, which has a conduction channel between its source and drain terminals, and a gate terminal that will be referred to as a control terminal. The current-regulation-transistor 424 may be a MOST or a bipolar transistor (or any other type of transistor), and can regulate current flow through the conduction channel (or the conductance of the conduction channel) in accordance with a regulation-control-signal received at its control terminal. As shown in FIG. 4, the current sensing element 426 is a current-sensing-resistor 426 in this example.

The current-sensing-resistor 426 and the conduction channel of the current-regulation-transistor 424 are connected in series with each other between the first input terminal 420 and the reference terminal 422. As discussed above, the current-sensing-resistor 426 and the conduction channel of the current-regulation-transistor 424 are also connected in series with the LED load 410, across the input current source 402.

The filter circuit 406 also includes a first feedback circuit, which in this example comprises an error amplifier 427. As will be discussed below, the first feedback circuit/loop is used to dynamically bring a sensed level of the voltage across the current-sensing-resistor 426 (sensed-voltage-level-signal) into line with a reference voltage level Vreg 428 (voltage-set-point-signal).

The error amplifier 427 has an error-amplifier-first-input-terminal 430, an error-amplifier-second-input-terminal 432 and an error-amplifier-output-terminal 434. In this example, the error-amplifier-first-input-terminal 430 is the negative input terminal, and the error-amplifier-second-input-terminal 432 is the positive input terminal.

The error-amplifier-first-input-terminal 430 is connected to the conduction channel of the current-regulation-transistor 424 and/or the current-sensing-resistor 426. In this way, the error-amplifier-first-input-terminal 430 receives a sensed-voltage-level-signal that is representative of a sensed voltage across the current-sensing-resistor 426. The error-amplifier-second-input-terminal 432 receives a voltage-set-point-signal, for example from a second feedback circuit, as will be discussed below with reference to FIG. 7. The error-amplifier-output-terminal 434 is connected to the control terminal of the current-regulation-transistor 424, in order to provide the regulation-control-signal to the current-regulation-transistor 424. In this way, the error amplifier 427 can set the regulation-control-signal such that the current flow though the conduction channel of the current-regulation-transistor 424 causes the sensed-voltage-level-signal to be brought into line with/tend towards the voltage-set-point-signal Vreg 428.

The first feedback circuit in this example can be considered as a relatively fast loop, which can set the regulation-control-signal periodically, at a first-regulation-bandwidth. The bandwidth of the error amplifier 427 may be large enough to react on voltage changes across the current-regulation-transistor 424. The first-regulation-bandwidth may be greater than that of the ripple component of the input voltage waveform, and may be greater than 100 Hz or 120 Hz (the ripple frequency will be 100 Hz for a 50 Hz mains supply, and 120 Hz for a 60 Hz mains supply). The first-regulation-bandwidth may be at least 5, 10, 100, 1,000 or 10,000 times greater than that of the ripple component. By providing a fast loop, the first feedback circuit can modulate the regulation-control-signal such that it is adjusted "within the ripple". That is, the regulation-control-signal is set/adjusted continuously, a plurality of times during a single AC waveform of the ripple component. In this way, the voltage sensed across the current-sensing-resistor 426 is kept close to the voltage-set-point-signal Vreg 428, despite the ripple voltage across transistor 424. As a result, the error amplifier 434 will control the regulation-control-signal such that a constant current is provided to the LED 410 load.

In one example, the power source/input current supply 402 is a single stage switching converter with an ideal power factor (perfectly sinusoidal input current). The converter input current is therefore a rectified sinusoidal current at the mains frequency. It can be calculated that, in this case, the converter output current, which is modelled as the input current source 402, is a sinusoidal current having a frequency that is twice the mains frequency, with an amplitude and offset that are both equal to the magnitude of the average current $I_{LED}$.

In a more general case, covering also switching converters that have a power factor of to less than unity, and switching converters that are used behind a phase-cut dimmer, the waveforms may be a bit different. Although precise figures would be different, in the following discussion we assume a perfect case in order to simplify the description. It will be appreciated that the following principles also apply to non-perfect cases.

For a sinusoid current, the relation between capacitor value $C_{out}$, LED average current $I_{LED}$ and capacitor ripple voltage $V_{ripple}$ is given by:

$$C_{out} = \frac{I_{LED}}{2\omega V_{ripple}}$$

Where:
ω is the mains frequency in radians.

To reduce/minimize dissipation, the linear ripple filter should only absorb the ripple voltage to achieve a fixed $V_{LED}$. Any additional DC voltage drop added to $V_{M1}$ (the voltage across the current-regulation-transistor 424) is wasted and reduces the efficiency. Therefore, in an optimal situation, the average voltage across the current-regulation-transistor 424 equals the ripple voltage amplitude ($V_{M1\_ave}=V_{ripple}$) while the current though the LED and current source is constant, so the efficiency of the system can be calculated as below:

$$\eta = \frac{P_{out}}{P_{loss}+P_{out}} = \frac{V_{LED}}{V_{M1\_ave}+V_{sns}+V_{LED}} = \frac{V_{LED}}{V_{ripple}+V_{sns}+V_{LED}}$$

By combining the two formula's, $C_{out}$ can be expressed as a function of the required efficiency, LED current and LED voltage:

$$C_{out} = \frac{I_{LED}}{2\overline{\omega}\left[\left(\frac{1}{\eta}-1\right)V_{LED}-V_{sns}\right]}$$

Figure 5:
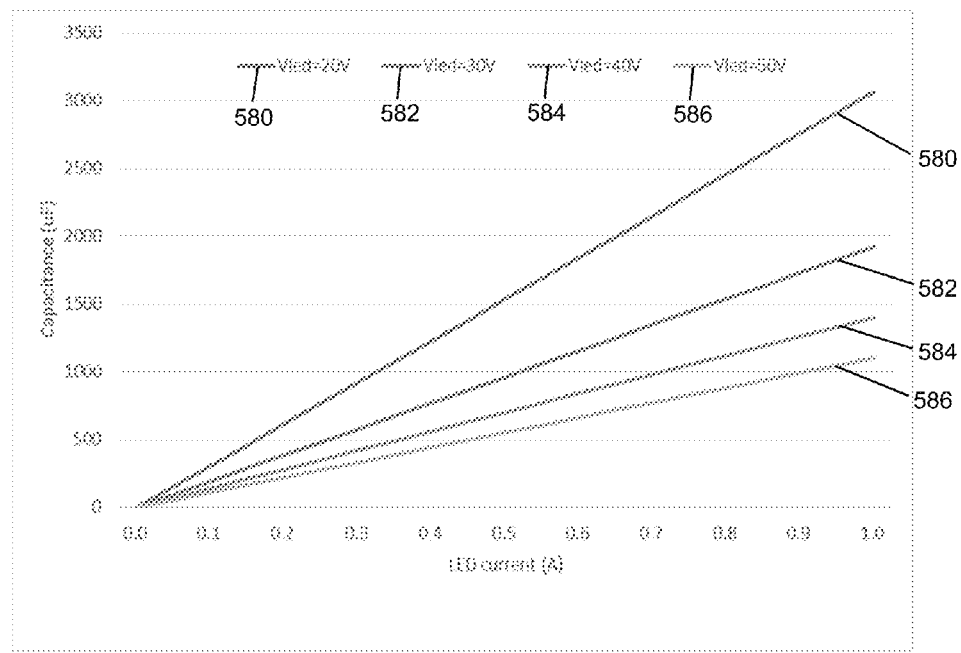
FIG. 5 shows graphically the relationship between required capacitance $C_{out}$ and LED voltage and LED current.

FIG. 5 shows graphically the relationship between required output capacitance $C_{out}$ (on the vertical axis) and LED current (on the horizontal axis) as defined by the above equation, for different values of $V_{LED}$. The values illustrated in FIG. 5 are calculated to provide an efficiency of η=0.97. Four different plots are shown: (i) 580—VLED=20V; (ii) 582—VLED=30V; (iii) 584—VLED=40V; and (iv) 586—VLED=50V.

The plot of FIG. 5, and associated equation, can be useful for circuit designers to calculate a required output capacitance value, when they have a known LED current level, a required LED voltage level for a desired level of illuminance, and a required efficiency value.

Figure 6:
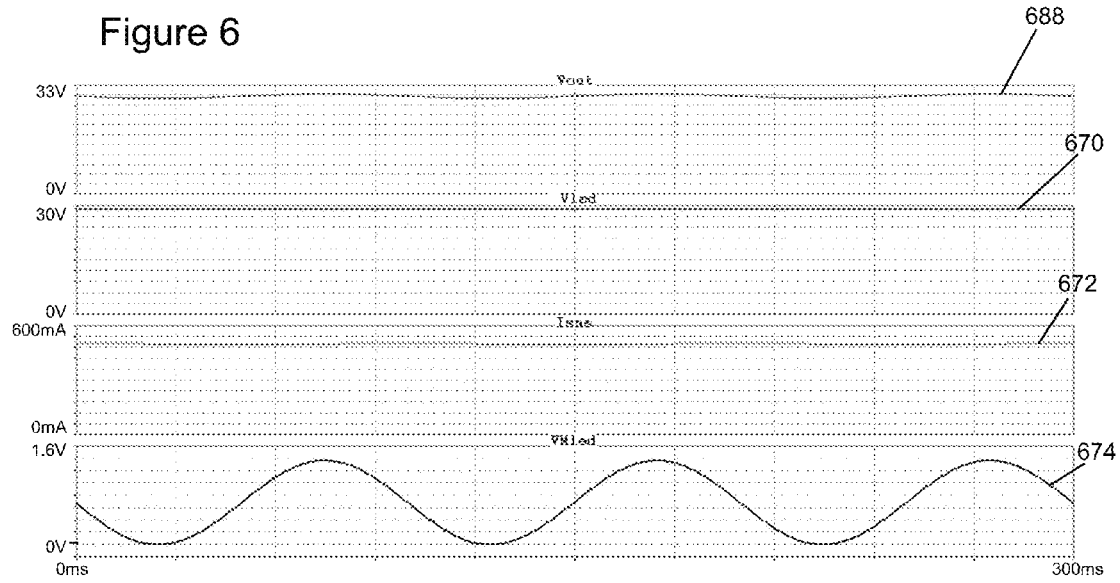
FIG. 6 shows example waveforms for various signals in the circuit of FIG. 4.

FIG. 6 shows example waveforms for the following signals in the circuit of FIG. 4:

$V_{out}$ 688, which is the voltage across the output capacitor $C_{out}$, and represents an input voltage to the LED load 410 and filter circuit;

$V_{LED}$ 670, which is the voltage across the LED;

$I_{sns}$, which is the current signal that is provided to current sense resistor 426 and is converted into a voltage that is supplied to the error-amplifier-first-input-terminal of the error amplifier. This current signal corresponds to the current through the LED, $I_{LED}$; and $V_{MLED}$, which is the voltage across the current-regulation-transistor (identified as $V_{M1}$ in FIG. 4).

The waveforms represent operation for $V_{LED}$=30V, $I_{LED}$=0.5 A and $C_{out}$~1 mF. Due to the limited capacitance of $C_{out}$, the capacitor voltage $V_{out}$ has some ripple. As can be seen from FIG. 6, use of the linear ripple filter can result in both $V_{LED}$ 670 and $I_{LED}$ (which is the same as $I_{sns}$ 672) being substantially constant. Therefore, the ripple voltage is substantially/completely absorbed by the current-regulation-transistor. The lowest momentary value for $V_{MLED}$ 674 is 0V, which shows that the circuit is operating at the optimal operating point with minimal losses. For sub-optimal circuits, the lowest momentary voltage of $V_{MLED}$ 674 would be greater than 0V, which could result in additional dissipation, for example as heat.

Figure 7:
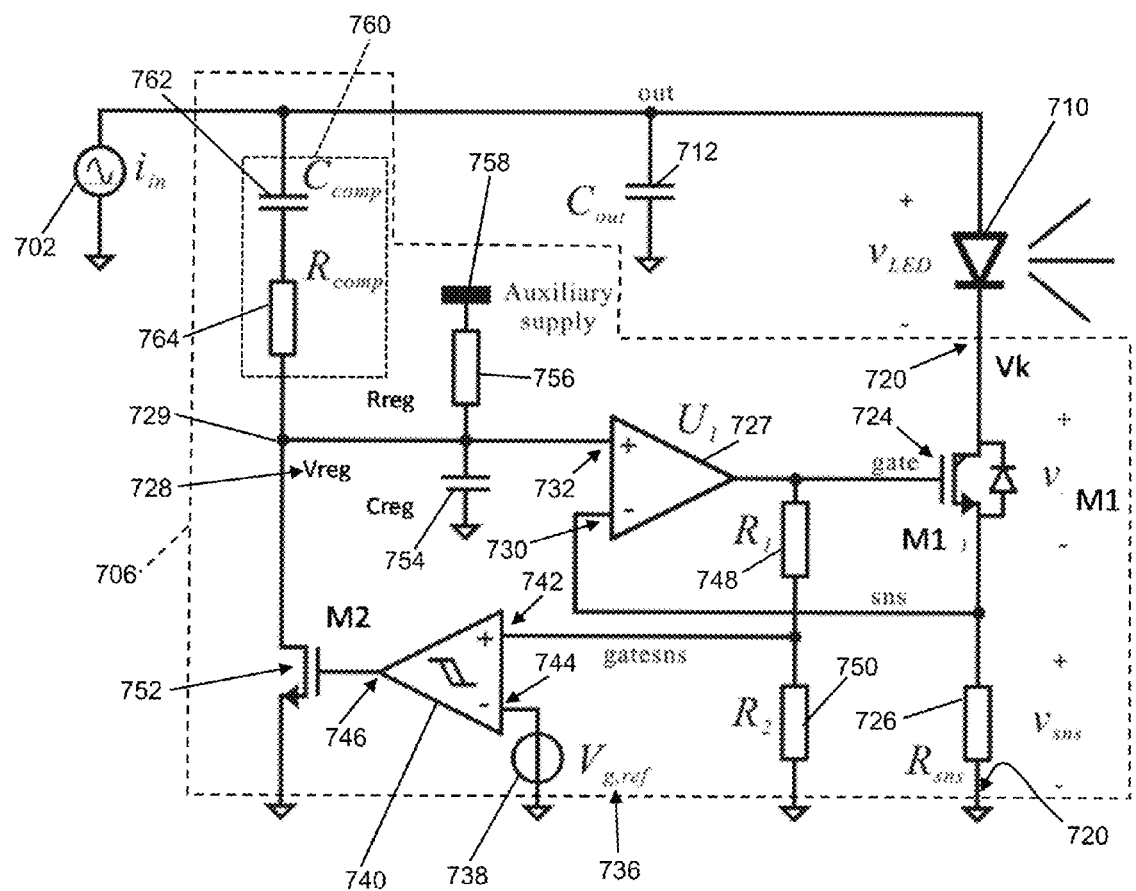
FIG. 7 illustrates an example embodiment of a linear ripple filter circuit, which can be used with the converter circuit of FIG. 3 for example.

FIG. 7 illustrates an example linear ripple filter circuit 706, which can be used with the converter circuit of FIG. 3 for example. Features of the filter circuit 706 of FIG. 7 that have already been discussed with reference to FIG. 4 will not necessarily be described again here. When compared with FIG. 4, the filter circuit 706 of FIG. 7 includes a second feedback circuit that sets the voltage-set-point-signal (Vreg 728) that is used by the error amplifier 727 of the first feedback circuit. The second feedback circuit can adjust the voltage-set-point-signal (Vref 728) in accordance with a comparison between the regulation-control-voltage-signal (that is provided to the to the control terminal of the current-regulation-transistor 724) and a predetermined-threshold-signal ($V_{g,ref}$ 736, as will be discussed below). The second feedback circuit can set the voltage-set-point-signal (Vref 728) such that the regulation-control-voltage-signal tends towards a desired peak voltage level that is less than an internal supply voltage for the filter circuit.

The second feedback circuit/control loop can regulate the reference voltage Vreg 728 such that the current through the regulation transistor 724 and LED load 710 is equal to the average current supplied by the input current source $i_{in}$ 702. This can enable the lowest momentary voltage of the voltage across the current-regulating-transistor M1 724 (which is shown as $V_{MLED}$ in FIG. 6), to be especially close to zero. In line with the above discussion of FIG. 6, this therefore provides an efficient circuit, with low dissipation/wasted energy. In addition, the reference voltage Vreg 728 can be controlled to maintain sufficient headroom for the current-regulating-transistor M1 724.

These improvements can be achieved because the filter circuit 706 does not have to be designed to take into account variations in one or more of: (i) the capacitance level of the output capacitor $C_{out}$ 712 (for example due to aging or temperature); (ii) the waveform or amplitude of the power converter output current $I_{in}$; (iii) characteristics of the current-regulation-transistor M1 724, such as the drain-source resistance of the current-regulating-transistor M1 724 when it is on ($R_{DSon}$), and the related transconductance K of the current-regulating-transistor M1 724 (which in this example is an NMOST); and (iv) the voltage dropped across the LED 710 $V_{LED}$, for example due to temperature changes. If the filter circuit were designed to take one or more of (i) to (iv) into account, then the additional design margin can result in an extra voltage drop across the current-regulation-transistor 724, and therefore can result in reduced efficiency.

The filter circuit disclosed herein may not suffer from drawbacks associated with using a fixed biasing point, because the circuit can automatically regulate to its optimum performance. Even the $R_{DSon}$ or the related transconductance K of the NMOST is not critical. The gate voltage of the pass transistor (current-regulation-transistor 724) is monitored to detect when the transistor operates at its minimum RDSon. At this point the gain from $V_{DS}$ to $V_{GS}$ is significant. Therefore no other sources of variation/spread need to be taken into account to ensure a sufficient margin for correct operation at all operating points.

Advantageously, this method of regulation can enable the current through the LED 710 to be substantially constant, even if the power source delivers a DC current with a portion of to AC content. Furthermore, this method of regulation can be relatively low cost and low complexity, for example when compared with the converter circuits of FIGS. 1 and 2.

The second feedback circuit includes an operational amplifier 740 that has an op-amp-first-input-terminal 742, an op-amp-second-input-terminal 744, and an op-amp-output-terminal 746. In this example, the op-amp-first-input-terminal 742 is the positive input terminal, and the op-amp-second-input-terminal 744 is the negative input terminal.

The op-amp-first-input-terminal 742 receives a regulation-control-voltage-signal (gatesns), which is representative of a voltage level of the regulation-control-signal that is provided to the control terminal of the current-regulation-transistor 724. In this example, the second feedback circuit also includes a resistive divider, which includes a first-resistive-divider-resistor $R_1$ 748 and a second-resistive-divider-resistor $R_2$ 750. The resistive divider is connected between the control terminal of the current-regulation-transistor 724 and ground. The node between the first-resistive-divider-resistor $R_1$ 748 and the second-resistive-divider-resistor $R_2$ 750 is connected to the op-amp-first-input-terminal 742. In this way, the resistive divider provides a signal to the operational amplifier 740 that is representative of the voltage level of the regulation-control-signal. It will be appreciated that the resistive divider is just one example of numerous component arrangements that could be used to provide a suitable signal to the op-amp-first-input-terminal 742.

The op-amp-second-input-terminal 744 is configured to receive a predetermined-threshold-signal, which in this example is provided by a threshold-voltage-source 738, which provides a signal with a voltage level of $V_{g,ref}$ 736. In this way, the operational amplifier 740 compares the regulation-control-voltage-signal (gatesns) with the predetermined-threshold-signal.

The level of $V_{g,ref}$ 736 is set such that the corresponding threshold voltage at the input of the voltage divider consisting of the resistors R1 748 and R2 750 $V_{g,ref}$*(R1+R2)/R2 is below the maximum voltage that is available at the output of the error amplifier 727. For example, if the internal amplifier supply voltage is 5V and the value of the second resistor R2 750 is infinite, then $V_{g,ref}$ 736 can be set as 4V or 4.5V. In this way, the regulation-control-signal tends towards an equilibrium in which the peak of the regulation-control-signal has a value of about 4V or 4.5V. In order to achieve maximum power efficiency, the voltage-set-point 728 should be regulated such that the voltage across the current-regulating-transistor M1 724 is as low as possible. This is achieved by making use of the maximum available gate voltage as that results into the lowest voltage drop across the current-regulating-transistor M1 724 for a given LED current. For this reason, the voltage level of $V_{g,ref}$ 736 (which is provided as a threshold level op-amp-second-input-terminal 744), that regulates the voltage-set-point Vreg 728, should only be exceeded if the regulation-control-signal is close to the maximum available output voltage of the error amplifier 727.

In this way, the voltage of the regulation-control-signal (the gate control voltage for the current-regulating-transistor M1 724) is kept as high as possible, without exceeding the voltage that can be provided by the error amplifier 727 (as defined by the internal supply voltage that is provided to the error amplifier 727). In this way, a minimum voltage drop across the current-regulating-transistor M1 724 can be achieved, whilst still being able to adequately remove any ripple component from the current through the LED 710 load.

In some examples, the voltage level of $V_{g,ref}$ 736 that is provided to the amp-second-input-terminal 744 as a predetermined-threshold-signal, may be set a value that is less than the maximum voltage level that can be provided at the output of the error amplifier 727. The voltage level of $V_{g,ref}$ 736 may be 10%, 20%, or 30% less, or may be 0.5V, 1.0V or 2V less, as non-limiting examples.

The op-amp-output-terminal 746 provides an op-amp-output signal that causes the voltage-set-point-signal (Vreg 728) to be reduced if the regulation-control-voltage-signal (gatesns) exceeds the predetermined-threshold-signal ($V_{g,ref}$ 736). In other examples, which use components with opposite polarities, the second feedback circuit can cause the voltage-set-point-signal (Vreg 728) to be increased if the regulation-control-voltage-signal (gatesns) is less than the predetermined-threshold-signal (Vg,ref 736), and otherwise the voltage-set-point-signal (Vreg 728) is reduced.

The second feedback circuit in this example can be considered as a relatively slow loop, which can periodically, but in small steps, reduce the voltage-set-point-signal (Vreg 728) if the regulation-control-voltage-signal exceeds the predetermined-threshold-signal. The second feedback circuit can periodically reduce the voltage-set-point-signal at a second-regulation-bandwidth. The second-regulation-bandwidth may be less than that of the ripple component of the input voltage waveform (the ripple frequency will be 100 Hz for a 50 Hz mains supply), for example at least 10, 50, 100 or 200 times less. As will be discussed below, when the regulation-control-voltage-signal does not exceed the predetermined-threshold-signal, the voltage-set-point-signal (Vreg 728) is increased. Typically, during normal operation, the value of the ripple component in the regulation-control-voltage-signal will be both greater than and less than the predetermined-threshold-signal during a single ripple period. Therefore, during a single ripple period the voltage-set-point-signal (Vreg 728) will be increased and decreased such that it settles around an equilibrium value.

In this example, the second feedback circuit also includes a second-feedback-transistor M2 752 (which in this example is a FET). The second-feedback-transistor 752 has a conduction channel and a control channel. The op-amp-output-terminal 746 is connected to the control channel of the second-feedback-transistor 752. The conduction channel of the second-feedback-transistor 752 is connected in series between the error-amplifier-second-input-terminal 732 and ground. In this way, the second-feedback-transistor 752 selectively connects the error-amplifier-second-input-terminal 732 to ground (though its conduction channel) in accordance with the output of the operational amplifier 740. As will be discussed below, such a connection to ground causes the voltage-set-point-signal ($V_{reg}$ 728) to be reduced. In this way, the op-amp-output-terminal 746 is connected directly or indirectly to the error-amplifier-second-input-terminal 732 such that a signal at the op-amp-output-terminal 746 can reduce the voltage-set-point-signal Vreg 728 provided to the error-amplifier-second-input-terminal 732.

In this example, the second feedback circuit also includes a regulator-capacitor Creg 754 and a regulator-resistor Rreg 756. The regulator-capacitor Creg 754 has a first plate that is connected to the error-amplifier-second-input-terminal 732, and has a second plate that is connected to ground. The regulator-resistor Rreg 756 has a first terminal that is connected to an auxiliary voltage supply 758, and has a second terminal that is also connected to the error-amplifier-second-input-terminal 732. In this way, the regulator-capacitor Creg 754 and the regulator-resistor Rreg 756 are connected in series between the auxiliary voltage supply 758 and ground, such that the node between the two components is connected to the error-amplifier-second-input-terminal 732.

In this way, the second feedback circuit contains a capacitor (regulator-capacitor Creg 754), holding the current set-point voltage, which is charged by an approximately constant current and discharged as long as the current control input of the current-regulation-transistor 724 exceeds a predetermined threshold. The regulator-resistor Rreg 756 and the auxiliary voltage supply 758 may together be referred to as a set-point-charge circuit, which is configured to increase the voltage-set-point signal Vreg 728 if the regulation-control-voltage-signal does not exceed the predetermined-threshold-signal. It will be appreciated that in other examples, the set-point-charge circuit can be implemented in different ways. For example, a switch-cap charger may be used.

The operational amplifier 740 and the second-feedback-transistor 752, can be considered as a discharge circuit that is connected between threshold-voltage-source 738 and the error-amplifier-second-input-terminal 732. As discussed above, the discharge circuit is configured to reduce the voltage-set-point signal Vreg 728 if the regulation-control-voltage-signal exceeds a predetermined-threshold-signal.

By providing a slow loop, the second feedback circuit can modulate the voltage-set-point-signal (Vreg 728) smoothly over many ripple cycles. That is, the voltage-set-point-signal (Vreg 728) may be reduced gradually in small steps over consecutive ripple periods (each time the regulation-control-voltage-signal exceeds the predetermined-threshold-voltage-signal ($V_{g,ref}$ 736)) or increase gradually while the regulation-control-voltage-signal does not exceed the predetermined-threshold-voltage-signal ($V_{g,ref}$ 736).

Due to the operation of the first regulation loop, the current through the LED load 710 follows directly from the voltage-set-point-signal Vreg 728 and sense resistor Rsns 726:

$$I_{LED} = \frac{V_{reg}}{R_{sns}}$$

So in order to minimize the ripple current through the LED load 710, it is important to minimize the ripple voltage at the voltage-set-point-signal Vreg 728. When the second regulation loop is in equilibrium, the regulation-control-voltage $V_{g,ref}$ exceeds the predetermined threshold level for a short amount of time during a single ripple period, and Vreg 728 is decreased exactly once in every ripple period. In equilibrium, this voltage reduction on Vreg 728 is just compensating the predetermined voltage ramp-up over one ripple period, that is fixed by the charge current supplied via regulation resistor Rreg 756 and filter capacitor Creg 754:

$$\Delta V_{reg} = \frac{I(R_{reg}) * T_{ripple}}{C_{reg}}$$

In which $T_{ripple}$ is the ripple period (for example 1/100 Hz). It will be appreciated that a bigger value for Creg 754 and/or Rreg 756 would result in lower ripple. However, large values will also result in slow adaptation if the average input current changes its value, for example as a result of setting a different brightness level. So a compromise can be made experimentally.

The time constants of the first and second feedback loops/circuits two loops can be set so as to effectively reduce the magnitude of the AC current (ripple) though the LED 710 load.

As will be discussed in more detail below, using the second feedback circuit of FIG. 7 to generate the reference voltage Vreg 728 can enable the filter circuit 706 to operate with a high level of efficiency because operation is tuned to actual operating parameters of the circuit (such as temperature, tolerance and variation in component values, the level of the load, etc.), as opposed to using a fixed biasing point, which may assume a worst-case scenario for various ones of these operating parameters and therefore incorporate additional design margins. Using a fixed biasing point can lead to additional losses.

The voltage-set-point-signal is the reference voltage Vreg 728 that is stored on the regulator-capacitor Creg 754. The regulator-capacitor Creg 754 in this example is continuously charged by an effectively constant current from the auxiliary voltage supply 758 and the regulator-resistor Rreg 756. The error amplifier 727, along with the current-regulating-transistor M1 724 and the current-sense-resistor 726 in the feedback, will draw an LED current proportionally with the reference voltage Vreg 728. As Vreg 728 is gradually rising, the LED current will also gradually rise until the voltage across the current-regulation-transistor 724 drops to zero. If this happens, the magnitude of the drawn current will be larger than the average current supplied by the power source/input current source 702. As the first feedback circuit will still try to drive the current as set by Vreg 728, the second feedback circuit can detect this event by monitoring the gatesns signal, which will be driven high by the error amplifier 727. The gatesns signal (that is provided to the op-amp-first-input-terminal 742) is a scaled version of the gate voltage (Vgate) of the current-regulation-transistor 724, due to the resistive divider provided by $R_1$ 748 and $R_2$ 750. When the gate voltage (Vgate) of the current-regulation-transistor 724 is driven high, the current-regulation-transistor 724 will operate in its linear or resistive region.

The drain-source current ($I_{DS}$) of a transistor operating at low Vds ($V_{ds} < V_{gs} - V_{th}$) can be modelled as $$I_{DS} = Kp\left[(V_{gs} - V_{th}) \cdot V_{DS} - \frac{V_{DS}^2}{2}\right]$$

Where:
$K_p$ is the steepness of the transistor in A/V^2; and
$V_{th}$ is the threshold voltage of the transistor.
This means that the gate-source voltage ($V_{gs}$) is $$V_{gs} = \frac{I_{DS}}{V_{DS} \cdot Kp} + \frac{V_{DS}}{2} + V_{th}$$

Where:
$V_{DS}$ is the drain-source voltage of the transistor; and
$I_{DS}$ is the drain-source current.
For a small $V_{DS}$ and fixed $I_{LED}$ the value of the first term containing $I_{DS}/V_{DS}$ increases rapidly for a decreasing $V_{DS}$. Therefore, any variation in $V_{th}$, due to for example component spread or temperature, can be unimportant because it will not have a significant effect on $V_{gs}$.

The second feedback circuit compares $V_{gatesns}$ (which is a scaled version of $V_{gate}$) to a reference $V_{g,ref}$. When $V_{gatesns} > V_{g,ref}$, the reference node 729 that is at the reference voltage Vreg 728 is discharged by the second-feedback-transistor M2 752. This reduces the LED current $I_{LED}$ and gives more voltage headroom to the current-regulation-transistor M1 724. The required $V_{gate}$ reduces as well, and $V_{gatesns}$ will drop below $V_{g,ref}$, thereby turning off/disabling the second-feedback-transistor M2 752. In this way, the second feedback circuit prevents $V_{gate}$ from getting too high, which could result in the current-regulation-transistor M1 724 running out of headroom. In this context, "headroom" is the additional voltage that can be handled by the transistor before the gate voltage can no longer increase and it starts reducing its drain-source current.

The ripple current $\Delta I_{LED}$ changes with twice the mains frequency and is set by the values of the regulator-resistor $R_{reg}$ 756 and the auxiliary supply voltage 758, the regulator-capacitor $C_{reg}$ 754 and the current-sensing-resistor $R_{sns}$ 726. The regulator-capacitor $C_{reg}$ 754 is charged by the regulator-resistor $R_{reg}$ 756 by what is essentially a DC current. The variation in voltage Vreg 728 sets $\Delta I_{LED}$ through $R_{sns}$. The criterion for choosing the current level through the regulator-resistor $R_{reg}$ 756 ($I_{Rreg}$) (and thereby the value of the regulator-resistor Rreg 756 for the given voltage of the auxiliary supply 758) is:

$$I_{R_{reg}} < \Delta i_{LED} C_{reg} R_{sns} \cdot 2 f_{mains}$$

As long as the above criterion is met, $I_{LED}$ will slowly oscillate around the operating point required to sink the average input current $\langle i_{in} \rangle = I_{LED}$.

If the stability of the complete loop is analysed, it can be found that the output capacitor $C_{out}$ 712 and the regulator-capacitor $C_{reg}$ 754 are two capacitors that can result in two poles that reside almost in the origin of the s-plane. This can result in a system that is unstable, because there can be little phase margin.

The second feedback circuit of FIG. 7 in this example also includes a stabilising-sub-circuit 760 that is configured to introduce a zero into the system in order to stabilize the second feedback circuit/loop. In this example the stabilising-sub-circuit 760 includes a compensation-capacitor $C_{comp}$ 762 and a compensation-resistor $R_{comp}$ 764 in series between the error-amplifier-second-input-terminal 732 (which is also the reference node 729) and the power source/input current source 702. The stabilising-sub-circuit 760 can also be said to be connected between the regulator-capacitor $C_{reg}$ 754 and either terminal of the LED 710 load. It will be appreciated that many other types of stabilising-sub-circuits 760 can be used to stabilise the second feedback loop, for example including active components, and that the RC network of FIG. 7 is just one non-limiting example.

The second feedback circuit sets the current set-point at the error-amplifier-second-input-terminal 732 such that the control input of the current-regulation-transistor 724 just equals a predetermined maximum value during each ripple period (assuming that a higher control value corresponds to a higher current or larger conductance).

All or part of the first and second feedback circuits can be assembled using discrete components or can be integrated in an IC.

A further feature of the filter circuit 706 of FIG. 7 is that it can be used to prevent, or reduce the likelihood of, an excessive peak current through the LED 710 when the LED 710 load is reconnected after is has been disconnected. During disconnection, the output capacitor $C_{out}$ 712 will be charged to a higher than nominal LED voltage until a safety feature of the power source will stop charging. In the absence of the filter circuit 706 of to FIG. 7, the LED 710 would be reconnected directly in parallel with the output capacitor $C_{out}$ 712, and the output capacitor $C_{out}$ 712 would discharge via the LED 710 load. This could damage the LED 710 load.

However, with the ripple filter 706, when the load LED 710 is disconnected, the feedback loops will still be operational. Under this condition, the current through the current-sensing-resistor $R_{sns}$ 726 will be zero, and the second feedback circuit/loop will settle the sensed gate voltage $V_{gatesns}$ around $V_{g\_ref}$ 736. This will cause the reference voltage Vreg 728 to be close to zero. After reconnection of the LED 710 load, it will take time to charge the reference voltage Vreg 728 to a value that is higher than zero. Therefore, the current through the LED 710 will gradually ramp up until it settles at a stable value, thereby avoiding a current surge that could damage the LED 710.

In this way, the presented linear ripple filter 706 can have an additional advantage that it can intrinsically enable hot-swap function for the LED 710 load. When an LED is connected to the output of the active linear ripple filter, $I_{LED}$ can be slowly ramped up from 0 A. When no LED is connected to the output, the second feedback circuit (secondary control loop) can discharge the reference for $I_{LED}$, resulting in regulation towards $I_{LED}$=0 A. After the LED is reconnected to the output, the current can automatically ramp up to its intended value in a controlled manner. That is, the filter circuit 706 can be used to prevent excessive rush-in current while the load is reconnected after earlier disconnection.

Figure 8:
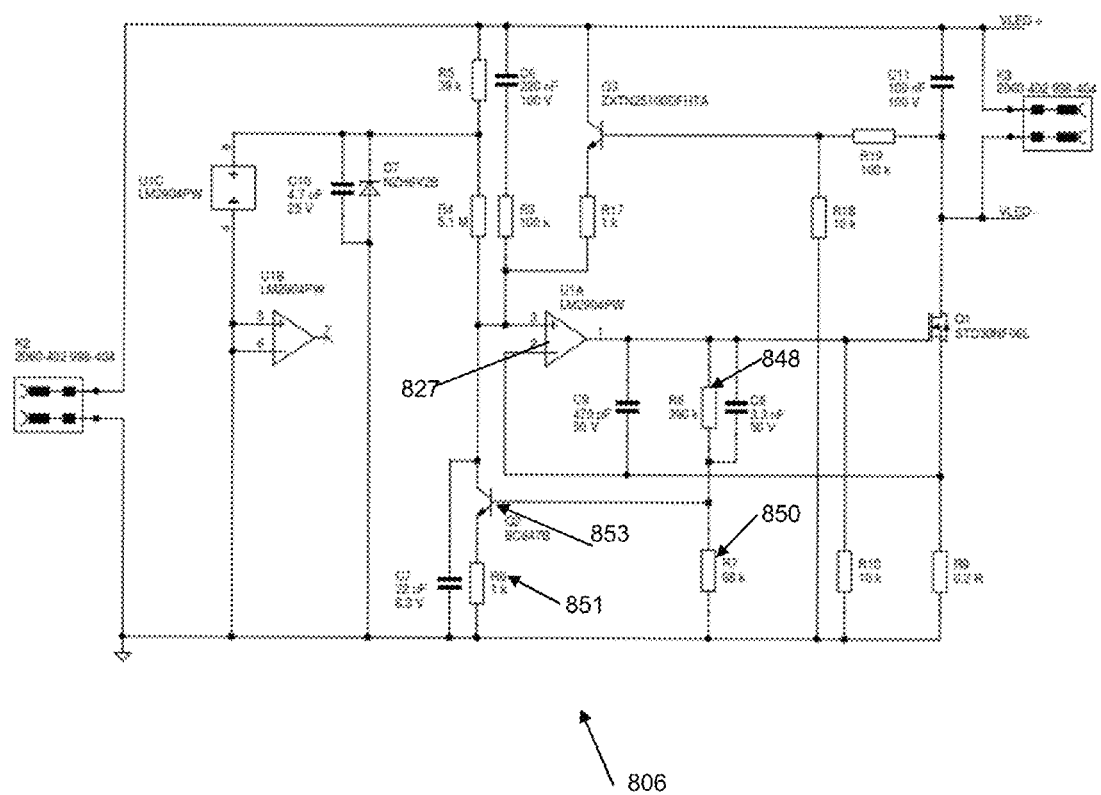
FIG. 8 illustrates another example embodiment of a linear ripple filter circuit.

FIG. 8 illustrates another ripple filter circuit 806, which is similar to the one shown in FIG. 7. Features of FIG. 8 that have already been described with reference to FIG. 7 will not be described again here. The discharge circuit of the second feedback circuit of FIG. 8 is different to that shown in FIG. 7.

In the implementation of FIG. 8, a single bipolar junction transistor (BJT) Q2 853 is used to provide the functionality of the operational amplifier and second-feedback-transistor of FIG. 7. The base of the BJT Q2 853 is connected to the resistive divider, which is provided by a first-resistive-divider-resistor R8 848 and a second-resistive-divider-resistor R7 850. The collector of the BJT Q2 853 is connected to first input terminal (in this example the positive input terminal) of the error amplifier 827. The emitter of the BJT Q2 853 is connected to ground via a resistor R6 851. Resistor R5, diode D7 and capacitor C10 derive the supply for the op amp U1A. Transistor Q3, resistors R17, R18 and R19 are added to improve the start-up of the circuit. Capacitor C9 is added to prevent the op amp U1A from to high frequency oscillation. The capacitor C11 is added for assuring stability with long wires.

In further alternative implementations, a comparator device may be used with its inputs swapped around (when compared to FIG. 7), and a diode at the output can be used to discharge the regulator-capacitor. It will be appreciated that any circuit can be used that discharges the regulator-capacitor if the regulation-control-signal exceeds a certain threshold.

It will be appreciated that in other examples complementary transistors and components can be used such that the polarities of the signals described with reference to the above examples can be inversed. For example a PMOST regulation device can be used. In such examples, it will be appreciated that a signal that "exceeds" a threshold level may be considered as a signal that has a value that is lower than the threshold level. Also, any description of increasing or decreasing signals can be reversed.

One or more examples disclosed herein relate to a linear ripple filter that uses a MOSFET in series with an LED to regulate $I_{LED}$. The linear ripple filter can be used to reduce the output ripple voltage and current of an LED driver that requires a high PF combined with a low output ripple. A control method can be used that allows automatic regulation towards an optimal operating point, irrespective of capacitance variation, effects of temperature and so on. This can result in reduced/minimal losses while increasing/maximizing the ripple reduction.

A first, fast, control loop can be used to ensure that $I_{LED}$ is regulated towards its intended DC value. A second, slow, control loop can be used to monitor the gate voltage of the MOSFET to achieve advantageous/optimal regulation of the LED current with reduced/minimal losses, regardless of component variations or temperature variations.

The linear ripple filter can be a lower cost solution than using an additional PFC power stage (for a two-stage solution) or an increased output capacitor (for a single-stage solution) to achieve similar LED current ripple and power factor performance.

Any of the filter circuits disclosed herein can be provided, entirely, or in part, as an integrated circuit (IC). Also, a lighting driver can be provided that includes any of the filter circuits disclosed herein.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled or connected may be coupled or connected either directly or indirectly. In the case of indirect coupling, additional components may be located between the two components that are said to be coupled, whilst still enabling the required functionality to be achieved.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A filter circuit comprising:
a first input terminal;
a reference terminal, wherein the filter circuit is configured to receive an input voltage waveform across the first input terminal and the reference terminal;
a current regulation device; and
a current sensing element,
wherein:
the current regulation device comprises a conduction channel and a control terminal, wherein the current regulation device is configured to regulate current flow through the conduction channel in accordance with a regulation-control-signal received at the current regulation device control terminal; and
the current sensing element and the conduction channel of the current regulation device, are connected in series with each other between the first input terminal and the reference terminal;
the filter circuit further comprising:
a first feedback circuit configured to:
receive a sensed-voltage-level-signal representative of a sensed voltage across the current sensing element;
receive a voltage-set-point-signal; and
set the regulation-control-signal such that the sensed-voltage-level-signal tends towards the voltage-set-point-signal; and
a second feedback circuit configured to:
receive a predetermined-threshold-signal;
receive a regulation-control-voltage-signal, representative of a voltage level of the regulation-control-signal; and
adjust the voltage-set-point-signal in accordance with a comparison between the regulation-control-voltage-signal and the predetermined-threshold-signal.

2. The filter circuit of claim 1, wherein the second feedback circuit is configured to reduce the voltage-set-point-signal if the regulation-control-voltage-signal exceeds the predetermined-threshold-signal, and otherwise increase the voltage-set-point-signal.

3. The filter circuit of claim 1, wherein the first feedback circuit is configured to regulate the regulation-control-signal at a first-regulation-bandwidth that is greater than that of a ripple component of the input voltage waveform.

4. The filter circuit of claim 3, wherein the first-regulation-bandwidth is at least 5, 10, 100, 1,000 or 10,000 times greater than that of the ripple component of the input voltage waveform.

5. The filter circuit of claim 3, wherein the frequency of the ripple component of the input voltage waveform is 100 Hz or 120 Hz.

6. The filter circuit of claim 1, wherein the second feedback circuit is configured to reduce the voltage-set-point-signal if the regulation-control-voltage-signal exceeds the predetermined-threshold-signal, at a second-regulation-bandwidth that is less than that of a ripple component of the input voltage waveform.

7. The filter circuit of claim 6, wherein the second-regulation-bandwidth is at least 10, 50, 100 or 200 times less than that of the ripple component of the input voltage waveform.

8. The filter circuit of claim 1, wherein the first feedback circuit comprises:
an error-amplifier comprising an error-amplifier-first-input-terminal, an error-amplifier-second-input-terminal and an error-amplifier-output-terminal, wherein:
the error-amplifier-first-input-terminal is connected to the conduction channel of the current regulation device or the current sensing element in order to receive the sensed-voltage-level-signal ;
the error-amplifier-second-input-terminal is connected to the second feedback circuit in order to receive the voltage-set-point-signal; and
the error-amplifier-output-terminal is connected to the control terminal of the current regulation device.

9. The filter circuit of claim 8, wherein the second feedback circuit comprises:
a threshold-voltage-source configured to provide a signal that corresponds to the predetermin-threshold-signal,
a set-point-discharge circuit connected to the error-amplifier-second-input-terminal, wherein the set-point-discharge circuit is configured to reduce the voltage-set-point signal if the regulation-control-voltage-signal exceeds the predetermined-threshold-signal, and
a set-point-charge circuit connected to the error-amplifier-second-input-terminal, wherein the set-point-charge circuit is configured to increase the voltage-set-point signal if the regulation-control-voltage-signal does not exceed the predetermined-threshold-signal.

10. The filter circuit of claim 9, wherein the discharge circuit comprises:
an operational amplifier comprising an op-amp-first-input-terminal, an op-amp-second-input-terminal, and an op-amp-output-terminal, wherein:

the op-amp-first-input-terminal is connected to the control terminal of the current-regulation-transistor in order to receive the regulation-control-voltage-signal, the op-amp-second-input-terminal is connected to the threshold-voltage-source, and the op-amp-output-terminal is connected directly or indirectly to the error-amplifier-second-input-terminal such that a signal at the op-amp-output-terminal can reduce the voltage-set-point-signal provided to the error-amplifier-second-input-terminal.

11. The filter circuit of claim 9, wherein the threshold-voltage-source is configured to provide a voltage signal at a level that is below the maximum voltage that is available to drive the control terminal of the current regulation device.

12. The filter circuit of claim 9, wherein the second feedback circuit also comprises a resistive divider, which includes a first-resistive-divider-resistor and a second-resistive-divider-resistor, wherein:

the resistive divider is connected between the control terminal of the current regulation device and the reference terminal, and the node between the first-resistive-divider-resistor and the second-resistive-divider-resistor is connected to the op-amp-first-input-terminal.

13. A power converter circuit comprising:
the filter circuit of any preceding claim;
an LED load; and
a PFC circuit;
wherein a terminal of the LED load is connected to either the first input terminal or the reference terminal of the filter circuit, and wherein the LED load and the filter circuit are together connected in series across an output of the PFC circuit.

14. The power converter circuit of claim 13, further comprising an output capacitor connected across the output of the PFC circuit.

15. An integrated circuit comprising the filter circuit of claim 1.

16. A filter circuit comprising:
a first input terminal;
a reference terminal, wherein the filter circuit is configured to receive an input voltage waveform across the first input terminal and the reference terminal;
a current regulation device; and
a current sensing element,
wherein:
the current regulation device comprises a conduction channel and a control terminal, wherein the current regulation device is configured to regulate current flow through the conduction channel in accordance with a regulation-control-signal received at the current regulation device control terminal; and
the current sensing element and the conduction channel of the current regulation device, are connected in series with each other between the first input terminal and the reference terminal;
the filter circuit further comprising:
a first feedback circuit configured to:
receive a sensed-voltage-level-signal representative of a sensed voltage across the current sensing element;
receive a voltage-set-point-signal; and
set the regulation-control-signal such that the sensed-voltage-level-signal tends towards the voltage-set-point-signal; and
a second feedback circuit configured to:
receive a predetermined-threshold-signal;
receive a regulation-control-voltage-signal, representative of a voltage level of the regulation-control-signal; and
adjust the voltage-set-point-signal in accordance with a comparison between the regulation-control-voltage-signal and the predetermined-threshold-signal; and
wherein the second feedback circuit is configured to reduce the voltage-set-point-signal if the regulation-control-voltage-signal exceeds the predetermined-threshold-signal, and otherwise increase the voltage-set-point-signal.

17. A filter circuit comprising:
a first input terminal;
a reference terminal, wherein the filter circuit is configured to receive an input voltage waveform across the first input terminal and the reference terminal;
a current regulation device; and
a current sensing element,
wherein:
the current regulation device comprises a conduction channel and a control terminal, wherein the current regulation device is configured to regulate current flow through the conduction channel in accordance with a regulation-control-signal received at the current regulation device control terminal; and
the current sensing element and the conduction channel of the current regulation device, are connected in series with each other between the first input terminal and the reference terminal;
the filter circuit further comprising:
a first feedback circuit configured to:
receive a sensed-voltage-level-signal representative of a sensed voltage across the current sensing element;
receive a voltage-set-point-signal; and
set the regulation-control-signal such that the sensed-voltage-level-signal tends towards the voltage-set-point-signal; and
a second feedback circuit configured to:
receive a predetermined-threshold-signal;
receive a regulation-control-voltage-signal, representative of a voltage level of the regulation-control-signal; and
adjust the voltage-set-point-signal in accordance with a comparison between the regulation-control-voltage-signal and the predetermined-threshold-signal; and
wherein the first feedback circuit comprises:
an error-amplifier comprising an error-amplifier-first-input-terminal, an error-amplifier-second-input-terminal and an error-amplifier-output-terminal, wherein:
the error-amplifier-first-input-terminal is connected to the conduction channel of the current regulation device or the current sensing element in order to receive the sensed-voltage-level-signal;
the error-amplifier-second-input-terminal is connected to the second feedback circuit in order to receive the voltage-set-point-signal; and
the error-amplifier-output-terminal is connected to the control terminal of the current regulation device.

* * * * *